(12) United States Patent
Parker et al.

(10) Patent No.: US 11,988,488 B2
(45) Date of Patent: May 21, 2024

(54) TRACKING PROJECTILE FOR TARGET DESIGNATION

(71) Applicant: Insights International Holdings, LLC, Franklin, VA (US)

(72) Inventors: Evan Parker, Newsoms, VA (US); Evan Jackson Parker, Newsoms, VA (US)

(73) Assignee: INSIGHTS INTERNATIONAL HOLDINGS, LLC, Franklin, VA (US)

( * ) Notice: Subject to any disclaimer, the term of this patent is extended or adjusted under 35 U.S.C. 154(b) by 185 days.

(21) Appl. No.: 17/845,273

(22) Filed: Jun. 21, 2022

(65) Prior Publication Data

US 2023/0266106 A1    Aug. 24, 2023

Related U.S. Application Data

(60) Provisional application No. 63/288,586, filed on Dec. 11, 2021.

(51) Int. Cl.
   *F42B 12/36*   (2006.01)
   *G01S 1/70*   (2006.01)

(52) U.S. Cl.
   CPC .......... *F42B 12/365* (2013.01); *G01S 1/7034* (2019.08)

(58) Field of Classification Search
   CPC ....... F42B 12/365; F42B 12/40; G01S 1/7034
   See application file for complete search history.

(56) References Cited

U.S. PATENT DOCUMENTS

| | | | | |
|---|---|---|---|---|
| 3,469,260 A | * | 9/1969 | Holt, Jr. | F41G 7/2206 342/55 |
| 4,267,562 A | * | 5/1981 | Raimondi | F42B 12/365 348/284 |
| 4,281,809 A | * | 8/1981 | Oglesby | F41G 7/226 244/3.14 |
| 6,564,146 B1 | * | 5/2003 | Meyer | F41G 7/001 342/119 |
| 7,055,420 B1 | * | 6/2006 | Lois | F42C 15/44 342/45 |
| 7,503,521 B2 | | 3/2009 | Maynard | |
| 11,248,891 B2 | | 2/2022 | Koontz | |
| 2008/0017752 A1 | * | 1/2008 | Shukrun | F42B 12/365 244/3.15 |
| 2009/0000465 A1 | * | 1/2009 | Deflumere | F42B 12/58 89/1.11 |

(Continued)

FOREIGN PATENT DOCUMENTS

GB    2201494 A  *  9/1988  .............. F42B 12/40

OTHER PUBLICATIONS

No author given; "Flight Termination Systems Commonality Standard"; Document 319-14; Sep. 2014; published by Secretariat, Range Commanders Council; U.S. Army White Sands Missile Range, New Mexico, USA. (Year: 2014).*

*Primary Examiner* — Bernarr E Gregory
(74) *Attorney, Agent, or Firm* — Fish IP Law, LLP; Tomas A. Prieto

(57) ABSTRACT

A system and method for ordnance delivery that includes a projectile that, when embedded into a target, can transmit information such as location and position information to a computing device. The computing device can relay this information to a weapon system that can deliver ordnance to the target accurately.

14 Claims, 4 Drawing Sheets

(56) References Cited

U.S. PATENT DOCUMENTS

| | | |
|---|---|---|
| 2012/0048993 A1* | 3/2012 | Velez .................. F42B 10/48 244/3.28 |
| 2015/0128823 A1* | 5/2015 | Akcasu ............... F42B 12/365 102/501 |
| 2016/0341531 A1* | 11/2016 | Kotenkoff ............... F41G 3/18 |
| 2017/0336185 A1 | 11/2017 | Parker |
| 2019/0056200 A1 | 2/2019 | Teetzel |
| 2019/0129411 A1* | 5/2019 | Giessel ............... G05D 1/0016 |
| 2021/0063129 A1* | 3/2021 | Parker ................. F42B 12/365 |
| 2022/0049940 A1 | 2/2022 | Frederick |

* cited by examiner

TRACKING PROJECTILE FOR TARGET DESIGNATION

This application claims priority to U.S. provisional application 63/288,586, filed Dec. 11, 2021. U.S. provisional application 63/288,586 and all other extrinsic references contained herein are incorporated by reference in their entirety.

FIELD OF THE INVENTION

The field of the invention is tracking ordnance and ordnance delivery.

BACKGROUND

The background description includes information that may be useful in understanding the present invention. It is not an admission that any of the information provided herein is prior art or relevant to the presently claimed invention, or that any publication specifically or implicitly referenced is prior art.

Accurate ordnance delivery is extremely important. In combat, errant ordnance delivery can result in unintended casualties and damage. Laser designators, GPS-guided munitions, and other improvements have increased the accuracy and precision with which munitions can be delivered. However, limitations remain. Many of these systems require a target to remain stationary or within visual range to be effective. Thus, if the target moves or otherwise becomes obscured, the ability to track the target for ordnance delivery can be lost. Moreover, in order to maintain a target designation on a moving target, the marking equipment (e.g., a laser designator) must move with the target, or else the target can move out of range and be lost.

Thus, there is still a need for an accurate ordnance delivery system that can account for a target moving in multiple environments and conditions, and can remain effective over long periods of time.

SUMMARY OF THE INVENTION

The inventive subject matter provides apparatus, systems and methods in which a projectile that include an electronics component and a transmitter can transmit a signal to a computing device. The computing device can, based on the signal, determine a location of the projectile and relay this location information to a weapon system that uses the location information to deliver ordnance to the location of the projectile.

The signal emitted by the projectile can include location information, such as GPS location information. In embodiments, the signal can be a beacon signal that a weapon system and/or ordnance fired can detect and use to guide the ordnance to the target.

The weapon system used to deliver the ordnance can be an aircraft, an artillery cannon or vehicle, a drone, or other weapon system. The computing device can, in embodiments, be integral to the weapon system. In other embodiments, the computing device can be separate from the weapon system (such as at a command post or base).

In embodiments, the signal can be sent directly from the projectile to the computing device. In other embodiments, an intermediary device can be used to relay the signal from the projectile to the computing device. For example, a relay system could be embedded in a drone or other vehicle that is within a range of the projectile's signal that then relays the signal to the computing device and/or weapon system that is farther away.

Various objects, features, aspects and advantages of the inventive subject matter will become more apparent from the following detailed description of preferred embodiments, along with the accompanying drawing figures in which like numerals represent like components.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

DETAILED DESCRIPTION

It should be noted that any language directed to a computer should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1A:
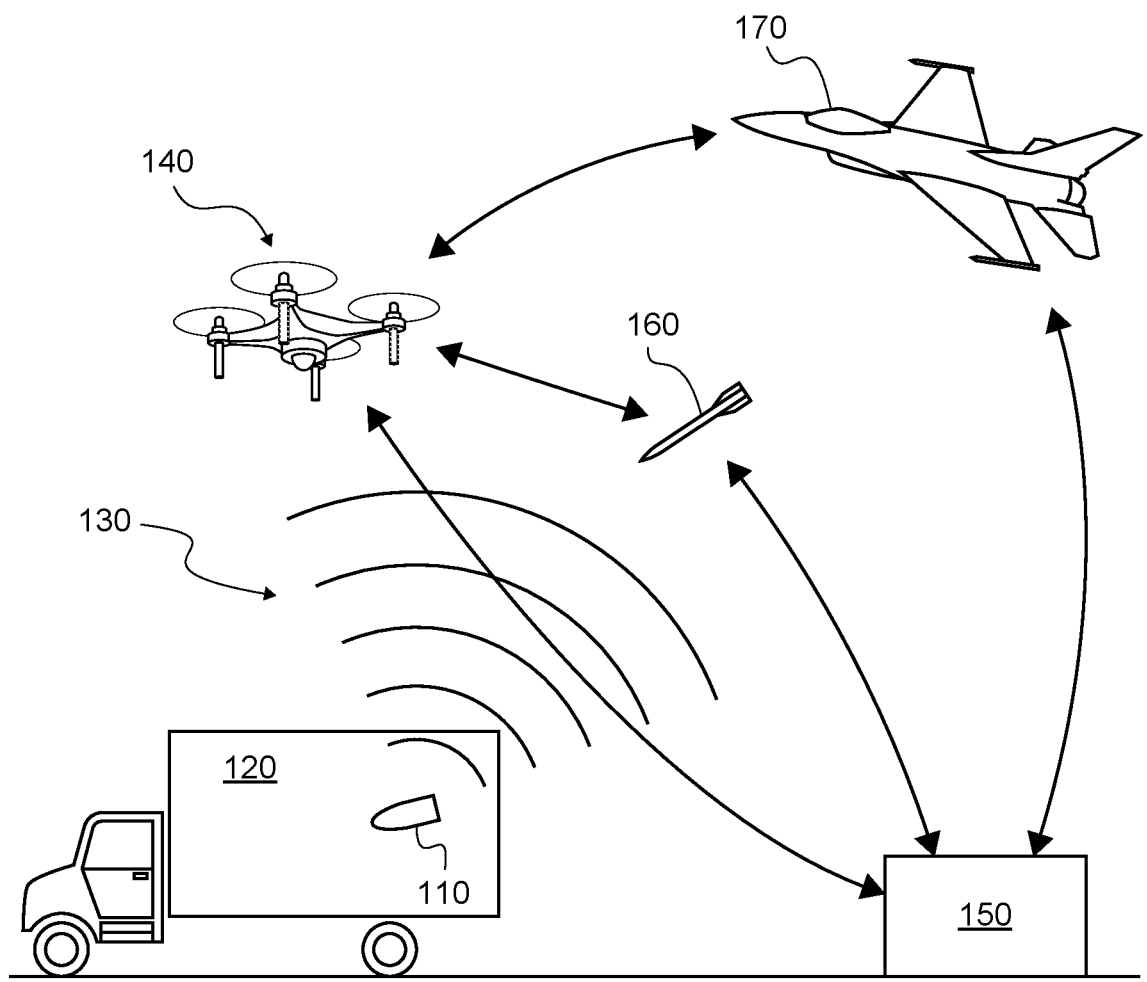
FIG. 1A is a diagrammatic overview of the system of the inventive subject matter, where the weapon system shown is an aircraft.

FIG. 1A shows a system according to embodiments of the inventive subject matter.

As seen in FIG. 1A, the system 100 includes a projectile 110 that has been embedded in a target 120. The target 120 can be a vehicle (as seen in FIG. 1), a person, an animal, or other stationary or mobile target.

As will be explained further below, the projectile 110 includes an electronics component and a transmitter component that generate a transmission signal 130 that is detected by a computing device 140 that is within range of the transmission signal 130.

Figure 1B:
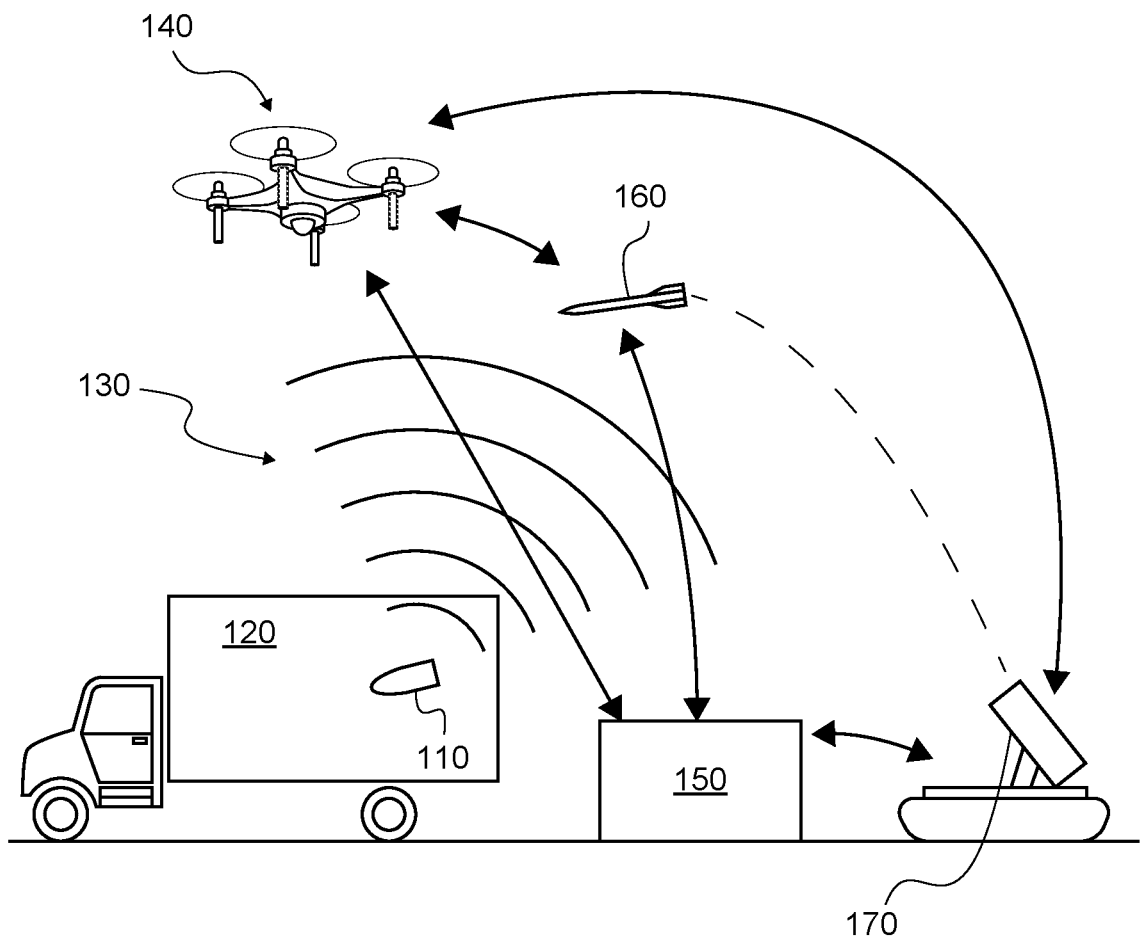
FIG. 1B is a diagrammatic overview of the system of the inventive subject matter, where the weapon system shown is an artillery vehicle.

In embodiments, the computing device 140 can then communicate information regarding the projectile 110 (and therefore, the target 120) to an ordnance delivery system 170 (in this case, a bomber) that carries ordnance 160. Contemplated ordnance delivery systems 170 can include manned aircraft, artillery cannons, ship-based weapon systems, submarines, other ground-vehicle-based weapon systems, stationary ground-based weapon systems, unmanned aerial vehicles ("UAVs"), unmanned ground vehicles ("UGVs"), unmanned undersea vehicles ("UUVs"), etc. For example, FIG. 1B shows a system where the weapon system 170 is an artillery vehicle. In certain embodiments the ordnance delivery system 170 and ordnance 160 can be a single system. For example, cruise missiles, loitering munitions such as "suicide" drones, etc.

In embodiments, the bomber 170 may not be within reach for the computing device 140. In these embodiments, the computing device 140 relays the information to a computing device 150 (that may be located in a base of operations, a larger vehicle, etc.), and then relays the information to the bomber 170. Thus, in embodiments such as the one shown in FIG. 1A-1B, the computing device 140 or the computing device 150 can be a relay device that can receive a relatively short-range communication signal 130 and then transmit information via a long-distance communication network to one or more of the bomber 170 and/or ordnance 160. In embodiments such as the one shown in FIG. 1A-1B, the computing device 140 can be located on a drone or other autonomous vehicle that is loitering or otherwise positioned within communication range of the projectile 110.

In embodiments of the inventive subject matter, the ordnance 160 can be a smart weapon that has its own internal communications and guidance systems. In these embodiments, the system can communicate the information from the projectile 110 to the ordnance 160 directly in addition to or instead of the bomber 170. This communication with the ordnance 160 can occur while the ordnance 160 is still attached to the bomber 170 and also after launching, while the ordnance 160 is in flight towards its target. These weapons can include weapons that have guidance systems that can receive a signal that allows for course-correction in flight, even if the ordnance does not have its own propulsion. Examples of these types of ordnance 160 can include guided air-, ground- or water-launched rockets or missiles, cruise missiles, guided mortar shells, torpedoes, suicide drones, etc.

In other embodiments of the inventive subject matter, the ordnance 160 can be "dumb" weapons that do not have communications and/or guidance capabilities after launch. Examples of this type of ordnance includes bombs dropped from aircraft, "dumb" mortar rounds, unguided rockets, unguided rocket-propelled grenades, rifle or other cannon rounds (such as rounds from the gun of an aircraft), "dumb" underwater projectiles (such as spears launched from a spear gun), etc. In these embodiments, the weapon system 170 would be acquiring the signal 130 from the projectile 110 and performing the targeting functions prior to launching the ordnance 160.

Figure 2:
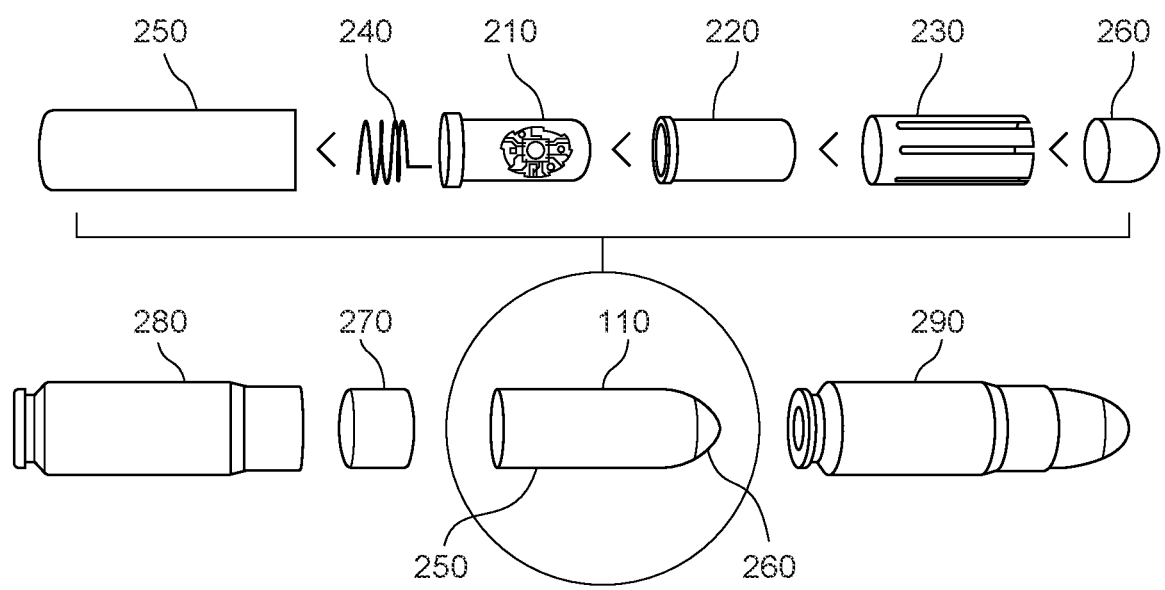
FIG. 2 shows an example of a projectile for use in the systems and methods of the inventive subject matter.

FIG. 2 shows an example of a suitable projectile system that can be used for the purposes of the inventive subject matter. The system of FIG. 2 is discussed in greater detail in Applicant's U.S. patent application Ser. No. 16/900,226, which is incorporated herein by reference in its entirety. The projectile 110 of FIG. 2 is an example of a projectile that can be shot by a firearm into a target.

Projectile 110 includes an electronics component 210 which is enclosed within the housing exoskeleton 220 when the bullet is assembled. In the embodiment shown in FIG. 2, the electronics component 210 includes a transmitter and as such, is coupled to antenna 240 for signal transmission. As assembled, a core 260 is inserted into a first end of the deceleration sleeve 230. The core 260 is made of a material that deforms upon impact and entry into a target body. For example, core 260 can be a lead core or made from another suitable material (e.g., polymer, composite, copper, steel or other hard or soft metals).

The deceleration sleeve 230 encases the housing exoskeleton 220 which contains the electronics component 210, all of which are encased within the outer jacket 250. The outer jacket 250 is then incorporated to finish the assembly of bullet 200. However, it should be noted that in the assembled bullet the tip of core 260 is exposed and not completely enveloped by the outer jacket 250. This is visible from in FIG. 2.

As seen in FIG. 2, projectile 110, powder charge 270 and case and primer 280 are then assembled into the finished cartridge 290.

The electronics component 210 can include a tracking device designed to track the location of the device when active (e.g., GPS device or other location determination system). It typically includes a transmitter that can transmit data to a remote computer, such as to communicate the location data and other types of data. The electronics component 210 can also include components such as biomonitors (that can monitor biometric aspects of a target such as heartbeat, temperature, the type of target hit, etc.), microphones, etc. Typically, in addition to having hardware for the specific purpose(s) of the projectile 110 (e.g., sensors, transmitters, etc.) the electronics component 210 will include a processor and physical memory (e.g., RAM, ROM, flash memory, solid-state memory, etc.) that store the programming for the electronics component 210 to execute its functions. The electronics component 210 also includes a battery or other type of portable power supply to power the various parts of the electronics component 210.

The electronics component 210 shown in FIG. 2 is encased in a potting material that is shaped to fit within the housing exoskeleton 220. To encase the electronics component 210, the electronics component 210 is placed within a mold and the potting material then poured into the mold, enveloping the electronics component 210. The potting material then hardens around the electronics component 210 leaving the assembled electronics component 210 with the potting material in the proper shape to fit within the housing exoskeleton 220. Alternatively, the electronics component 210 can be placed within the housing exoskeleton 220 and the potting material poured into the exoskeleton 220 directly such that the potting material encases the electronics component and hardens in the shape of the inside of the exoskeleton 220.

The potting material can be a polymer or other material that can be shaped in this way. The electronics component 210 is seen in FIG. 2 inside the potting material for illustrative purposes. The potting material may be transparent or translucent, such that the electronics component 210 is visible, or it may be opaque such that the electronics component 210 inside is not visible.

The embodiment in FIG. 2 shows an antenna 240 that is external to the electronics component 210. The antenna 240 enables wireless communication to/from the electronics component 210 across various wireless communications technologies (e.g., WiFi, cellular communication along various spectrums (e.g., 4G, 5G, etc.), RF, Bluetooth, NFC, etc.). Thus, the signal 130 can be an RF signal or other type of wireless communication signal.

It is contemplated that the electronics component 210 could have an internal antenna in addition to/instead of the external antenna 240. Having an internal antenna in addition to the external antenna 240 can provide the electronics component 210 with additional wireless communication modalities, and can allow for simultaneous data transmission among these modalities. For example, the external antenna 240 can be a long range RF antenna while the internal antenna could be a short-range antenna such as a Bluetooth or NFC antenna. Another benefit of having both an internal and external antenna is that, during deployment, the external antenna may become damaged. If this occurs, the internal antenna (which could be of the same or a different wireless technology) serves to provide a backup way for the electronics component 210 to transmit/receive data.

In embodiments of the inventive subject matter, the housing exoskeleton 220 itself can be used as an antenna instead of or in addition to the external antenna 240. Projectiles having this feature are described in Applicant's own U.S. patent application Ser. No. 17/487,990 filed Sep. 28, 2021, titled "Ordnance Delivery System Using a Protective Housing as an Antenna", which is incorporated herein by reference in its entirety.

It is contemplated that the electronics component 210 can communicate with cellular towers, satellites, repeaters, networking devices, mobile devices, and other computer devices. Thus, the electronics component 210 can communicate directly with a controller's computing device or relay the signal indirectly via various types of communication technologies.

In some embodiments, the communications capabilities of the electronics component 210 are transmit-only. In other embodiments, the electronics component 210 is also capable of receiving data transmissions. This can include additional instructions, updates, etc., that can alter the functions of the electronics component 210 after deployment.

In embodiments, the electronics component 210 can communicate with other electronics components 210 of other bullets 200, forming an ad-hoc mesh wireless network. This can be used to relay a more complete representation of a situation to the controller's computing device. This can also be used to relay the signal from one or more bullets 200 back to the computing device 140/150 or the bomber 170. For example, a series of bullets 200 can be fired at various locations near the intended target at distances such that each bullet 200 is within communication range of two other bullets in a chain, such that the series of bullets 200 forms a communication chain that leads from the intended target back within communication range of the operator (in this example, bomber 170). In this way, the operator (which could also be the shooter) could track the location of the target that might be outside of the transmission range of a single projectile 200. Likewise, this method can be used to target multiple targets at once, such that the bomber 170 can track and simultaneously eliminate a plurality of targets without the need for additional equipment on location.

In embodiments of the inventive subject matter, the electronics component 210 can include a speaker or other audio transducer that can emit a sound or noise. The processor of electronics component 210 can generate a signal that is output as a sound or noise. In a variation of these embodiments, the audio transducer is configured to emit sounds outside of the human audible spectrum. These signals can then be detected by a microphone of a system that is programmed to listen for the audio signal at the corresponding sound frequency. The sound can be in the form of an audio signature that is recognized by a sensing computing device. This way, the projectile 110 can emit a sound signal to transmit information without being detected by humans.

In embodiments of the inventive subject matter, the projectile 110 does not use a deceleration sleeve.

Figure 3:
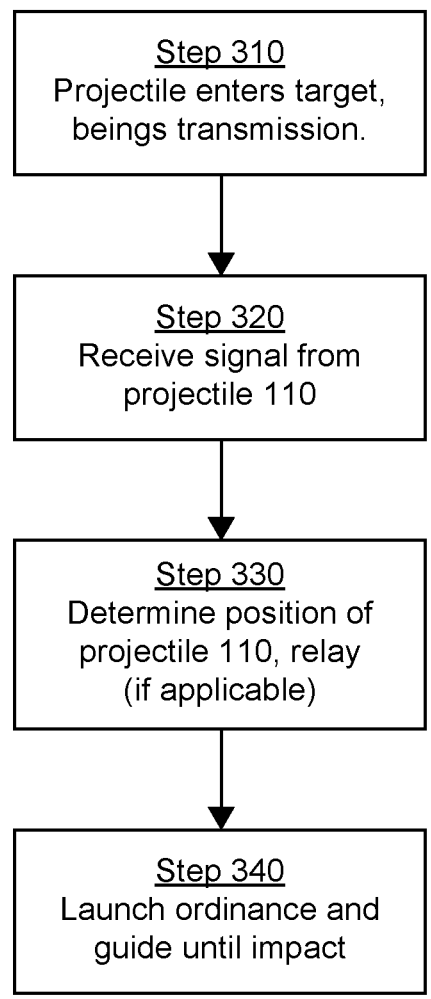
FIG. 3 provides a flowchart of the processes performed by the system, according to embodiments of the inventive subject matter.

FIG. 3 provides a flowchart of the processes performed by the system 100, according to embodiments of the inventive subject matter.

At step 310, the projectile 110 enters target 120 and begins transmission of signal 130 via its transmitter. The signal 130 can include information such as the location of the projectile 110, and other gathered sensor information. The location information can be obtained from an on-board GPS module, by triangulation with cellular towers, or other methods. The location information of the signal 130 can also include positional information such as elevation. Other signal information could include information such as temperature, humidity, etc., gathered via corresponding on-board sensors. If the target is a living being (e.g., animal or human), the sensor information could include biometric information such as a detection of a heartbeat, temperature, chemicals detected, etc.

In embodiments where the electronics component 210 includes a speaker, the transmission can be a sound transmission instead of or in addition to an RF or other wireless signal.

In embodiments of the inventive subject matter, the processor of the electronics component 210 can be programmed to delay the start of transmission of signal 130 based on detected conditions or circumstances about the target.

For example, in embodiments, the processor of the electronics component 210 can, based on signals from the GPS device, determine that the projectile 110 (and therefore the target in which it is embedded) is moving. The processor can be programmed to initiate the transmission of signal 130 upon determining that the projectile 110 has stopped moving for a certain amount of time. This can be a determination that the projectile 110 has stopped moving altogether for a certain amount of time, has been moving but below a speed threshold for a certain amount of time, or only moved within a certain distance for a certain amount of time. Once this threshold is met, the processor initiates the transmission of signal 130. This embodiment addresses a use case where an operator wishes to determine a base of operations for a target. By delaying the transmission until the target has arrived back at their base of operations, the projectile 110 minimizes the chances of detection of the emissions of its signal 130 while the target is still in route.

In a variation of these embodiments, the electronics component 210 can be programmed to passively listen to the surrounding signals environment. If the electronics component 210 determines that the surrounding signals environment would cause interference with a sent signal 130 (either due to an electronic jamming presence or an unfavorable environment for data transmission), the electronics component 210 can delay the transmission of signal 130. It can then continuously or periodically continue to passively monitor its electronic environment until the processor determines that it is more favorable to transmission. At that point, it can begin transmitting.

In another variation of these embodiments, the electronics component 210 can transmit, via the antenna, an initial status transmission. The computing device 140 receives this signal and transmits a response confirming a successful "check in" by the projectile 110. After receiving this confirmation, the electronics component 210 begins the transmission of signal 130.

If the electronics component 210 does not receive a response from the computing device 140 (either because the computing device 140 never received the initial check-in message or the reply message was not detected by the electronics component 210), the electronics component 210 can delay the transmission of signal 130. After the initial check-in message, the electronics component 210 can periodically transmit subsequent check-in messages until it receives a response. Once a response is received, the electronics component 210 can begin transmitting signal 130. In embodiments, the electronic component 210 can be programmed with a maximum number of check-in attempts and/or a maximum amount of time that it attempts to check in without a successful response. In these embodiments, the electronics component 210 can be programmed to, upon reaching a threshold of a maximum time and/or number of attempts, begin transmission of signal 130.

It is contemplated that the delay features discussed above can be a priori programmed into the electronics component 210 by an operator prior to the firing of the projectile 110. This programming can be performed via a computing device that can communicate with the projectile 110 sometime before the firing of the projectile. This can occur prior to the loading of the projectile 110 into the weapon or while the projectile 110 is in the weapon prior to firing.

In embodiments, the electronics component 210 can incorporate a time delay to begin the transmission of signal 130 to allow for a weapon system 170 (e.g., bomber, artillery cannon, etc.) to get on station/within probable range. For example, an operator with knowledge or an estimate of the time it will take weapon system 170 to be on station/ready to fire can program this delay into the electronics component 210 such that the transmission of signal 130 begins when the weapon system 170 is likely to be ready.

In embodiments, this delay can include the check-in functions discussed above to confirm that the weapon system 170 is on station/ready to acquire the target and deliver its ordnance 160. In these embodiments, the electronics component 210 can begin transmission of signal 130 upon receiving a confirmation by the weapon system 170 and/or another computing device 140 that the weapon system 170 is ready.

The astute reader will appreciate that the delay functions discussed above not only serve the purpose of avoiding detection of the projectile 110 by an enemy, but also serve to conserve the on-board battery of the projectile 110 by avoiding transmission during undesired/sub-optimal times.

In embodiments, the electronics component 210 can be programmed to employ frequency-hopping transmission techniques to avoid signal jamming. This signal-hopping can be a default setting or in response to a detected jamming/heavily noisy signals environment. It is also contemplated that signal-hopping can be incorporated into the delayed-transmission embodiments discussed herein as well.

At step 320, the computing device 140 receives the signal 130 and relays the information in the signal 130 to the computing device 150 or to the bomber 170 and/or the ordnance 160 at step 330. In embodiments, the signal 130 can be directly received by the device 150. In still other embodiments, the signal can be received directly from the projectile 110 by the bomber 170 and/or ordnance 160 (if the bomber 170 and/or ordnance 160 are within the range of the signal 130).

At step 330, one or more of the device 140, device 150, bomber 170 (via on-board computer device) or ordnance 160 determines the position of the projectile 110 based on the signal 130 and/or information contained within the signal 130. In embodiments, the information in the signal can include location information (e.g., GPS information) or other information that can be used to determine the position of the projectile 110. In embodiments, the signal 130 itself can be a used as a beacon by one or more of the device 140, device 150, bomber 170 or ordnance 160 to determine the position of the projectile 110.

In embodiments where the device 140 and/or device 150 determines the location of the projectile 110, the location information is then relayed to the bomber 170 and/or the ordnance 160.

In embodiments, the computer on-board bomber 170 and/or ordnance 160 can establish a lock on the projectile 110 based on the obtained information.

At step 340, the ordnance 160 is launched by the bomber 170. While the ordnance 160 is in flight, the processes of steps 320 and 330 are repeated such that the ordnance 160 can remain locked on to the location of the projectile 110 even if the projectile 110 begins to move (due to the object within which the projectile 110 is embedded moving). This process continues to repeat until impact by the ordnance 160.

In embodiments of the inventive subject matter, the information contained in the signal 130 can be relayed to other computing devices and displayed for users. For example, the location information can be transmitted to a computing device at a command post and displayed on a map. In another example, location and position information can be relayed to soldiers nearby equipped with augmented reality ("AR") systems. The location and position of the projectile 110 can then be overlaid in real-time to these AR systems.

It is contemplated that the systems and methods of the inventive subject matter can be used to track and deliver ordnance to underwater targets as well. Because of the medium, underwater radio communications are different than communications outside of water. As such, in these embodiments, the projectile 110 can carry equipment for underwater acoustic communications. In these embodiments, an unmanned vehicle can follow the target based on the signal from the projectile 110, and periodically surface to communicate a location to other devices via longer-range wireless communications.

In these embodiments, the weapon system 170 can be any weapon system that can delivery a projectile 110 for underwater applications. Thus the weapon system 170 can be a manned or unmanned vehicle such as an aircraft, a ship, a submarine, etc. In these embodiments, projectile 110 can be deployed via underwater propelled delivery systems, harpoons, spears, or other suitable underwater-deployed projectiles. The ordnance 160 can include torpedoes or other propelled underwater munitions that can follow a signal to a target. In a variation of these embodiments, the ordnance 160 can include naval mines that include a controller programmed to detonate based on a proximity or other signal from projectile 110.

In underwater applications, the projectile 110 can also include noise-generating modules (e.g., a speaker or other acoustic transducer, a vibration mechanism, etc.) that can make noise to allow other submarines or vessels to track the projectile 110 (and thus, the target). These noises can be pings or other noises that alert nearby craft of the relative position of the projectile.

The sound and/or underwater acoustic communications signal can be used by ordnance such as a torpedo to acquire and pursue the target that is carrying the embedded projectile 110.

In these underwater embodiments, the electronics component 210 of projectile 110 can include sensors that can provide depth information (e.g., pressure sensors or other sensors capable of detecting a depth). In these embodiments, the processor is programmed to detect when the projectile 110 is at a depth that is less than a threshold depth. At this point, the electronics component 210 begins transmission of signal 130. In a variation of these embodiments, the electronics component 210 can begin transmission of the signal 130 based on a determination that the projectile 110 is above the water line.

The projectile 110 can be fired in a variety of ways. In embodiments, the projectile 110 will be fired by a weapon (e.g., a rifle or other firearm) manually operated by a human user. In other embodiments, the projectile 110 can be fired by a weapon mounted on a vehicle. It is contemplated that the vehicle can be manned or unmanned. Examples of contemplated unmanned vehicles can include unmanned aerial vehicles ("UAVs"), unmanned ground vehicles ("UGVs"), and unmanned undersea vehicles ("UUVs"). These unmanned vehicles can have a projectile launcher attached thereto or otherwise integrated into the system where the projectile 110 can be automatically fired at a target or remotely piloted and fired by a remote human operator.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:
1. A system for target designation, comprising:
  a projectile comprising:
    an electronics component programmed to generate a signal; and
    a transmitter configured to transmit the signal;

a computing device programmed to:
  receive the signal from the transmitter;
  determine a location of the projectile based on the signal;
  collect information regarding the location of the projectile;
  determine, based on the information regarding the location of the projectile, at least one of:
    that the projectile has stopped moving for a predetermined period of time;
    that the projectile has been moving below a predetermined speed threshold for the predetermined period of time; or
    that the projectile has moved under a predetermined distance for a predetermined period of time; and
  relay, based on the determination, information regarding the location of the projectile to a weapon system; and
the weapon system programmed to:
  deliver ordnance to the location of the projectile based on the relayed information.

2. The system of claim 1, wherein the weapon system comprises an aircraft weapon system and the ordnance comprises an aircraft-launched ordnance.

3. The system of claim 1, wherein the weapon system comprises an artillery weapon system and the ordnance comprises an artillery-launched ordnance.

4. The system of claim 1, wherein the signal includes location information.

5. The system of claim 4, wherein the location information comprises GPS location information.

6. The system of claim 1, wherein the signal comprises a beacon signal.

7. The system of claim 1, wherein the computing device is integral to an autonomous vehicle.

8. The system of claim 1, wherein the computing device is programmed to relay the information to a second computing device, and the second computing device is programmed to relay the information to the weapon system.

9. The system of claim 1, wherein the ordnance comprises a smart weapon and the computing device is computing device is programmed to:
  continuously relay the information regarding the location of the projectile to the ordnance after the ordnance has been launched by the weapon system.

10. The system of claim 1, wherein the weapon system is at least one of a ship, a submarine or underwater unmanned vehicle (UUV) and the ordnance comprises underwater ordnance.

11. The system of claim 10, wherein the underwater ordnance comprises an underwater propelled ordnance, spear or underwater projectile.

12. The system of claim 11, wherein the underwater propelled ordnance comprises a torpedo.

13. The system of claim 1, further comprising at least one additional projectile, each of the at least one additional projectile comprising an additional electronics component comprising a communications interface configured to receive the signal from the transmitter and generate a relayed signal to be relayed to the computing device.

14. The system of claim 13, wherein the projectile and the at least one additional projectile are programmed to form an ad-hoc mesh wireless network to enable the relay of the signal from the projectile to the computing device via the additional projectiles.

* * * * *